(12) United States Patent
Cho et al.

(10) Patent No.: US 9,476,483 B2
(45) Date of Patent: Oct. 25, 2016

(54) MULTI STAGE TRANSMISSION FOR VEHICLE

(71) Applicant: Hyundai Motor Company, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/741,856

(22) Filed: Jun. 17, 2015

(65) Prior Publication Data

US 2016/0146306 A1 May 26, 2016

(30) Foreign Application Priority Data

Nov. 26, 2014 (KR) .................. 10-2014-0166833

(51) Int. Cl.
*F16H 3/62* (2006.01)
*F16H 3/66* (2006.01)

(52) U.S. Cl.
CPC ......... *F16H 3/66* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | | |
|---|---|---|---|---|
| 7,163,484 B2* | 1/2007 | Klemen | ................... | F16H 3/66 475/276 |
| 7,204,780 B2* | 4/2007 | Klemen | ................... | F16H 3/66 475/279 |
| 7,285,069 B2* | 10/2007 | Klemen | ................... | F16H 3/66 475/275 |
| 7,377,872 B2* | 5/2008 | Jang | ........................ | F16H 3/663 475/275 |
| 8,137,232 B2* | 3/2012 | Wittkopp | .................. | F16H 3/66 475/280 |
| 8,152,681 B2 | 4/2012 | Seo et al. | | |
| 8,177,674 B2* | 5/2012 | Baldwin | ................... | F16H 3/66 475/275 |
| 8,303,455 B2 | 11/2012 | Gumpoltsberger et al. | | |
| 8,517,885 B2* | 8/2013 | Shim | ........................ | F16H 3/66 475/276 |
| 8,702,555 B1* | 4/2014 | Hart | ........................ | F16H 3/66 475/278 |
| 8,864,618 B1 | 10/2014 | Noh et al. | | |
| 9,005,073 B1 | 4/2015 | Noh et al. | | |
| 9,068,630 B2* | 6/2015 | Thomas | ................... | F16H 3/66 |
| 9,360,087 B1* | 6/2016 | Cho | ........................ | F16H 3/66 |
| 2002/0119859 A1 | 8/2002 | Raghavan et al. | | |
| 2008/0103015 A1 | 5/2008 | Seo | | |
| 2010/0048344 A1 | 2/2010 | Kamm et al. | | |
| 2010/0069195 A1 | 3/2010 | Baldwin | | |
| 2015/0094185 A1 | 4/2015 | Beck et al. | | |

(Continued)

FOREIGN PATENT DOCUMENTS

| | | |
|---|---|---|
| JP | 2005-36894 A | 2/2005 |
| JP | 2013-68319 A | 4/2013 |

(Continued)

*Primary Examiner* — Dirk Wright

(74) *Attorney, Agent, or Firm* — Morgan, Lewis & Bockius LLP

(57) ABSTRACT

A multi stage transmission for the vehicle may include an input shaft and an output shaft, a first planetary gear device, a second planetary gear device, a third planetary gear device, and a fourth planetary gear device configured to transfer a rotating force between the input shaft and the output shaft and each including three rotating elements, and at least six shift elements connected to the rotating elements of the planetary gear devices.

7 Claims, 2 Drawing Sheets

(56) References Cited

U.S. PATENT DOCUMENTS

| | | | |
|---|---|---|---|
| 2015/0119188 A1 | 4/2015 | Beck et al. | |
| 2016/0091058 A1* | 3/2016 | Noh | F16H 3/66 475/278 |
| 2016/0146295 A1* | 5/2016 | Cho | F16H 3/66 475/277 |
| 2016/0146301 A1* | 5/2016 | Cho | F16H 3/66 475/277 |
| 2016/0146308 A1* | 5/2016 | Cho | F16H 3/66 475/269 |

FOREIGN PATENT DOCUMENTS

| | | |
|---|---|---|
| JP | 2013-199959 A | 10/2013 |
| JP | 2014-500462 A | 1/2014 |
| KR | 10-2009-0126112 A | 12/2009 |
| KR | 2011-0131816 A | 12/2011 |
| KR | 10-2012-0119451 A | 10/2012 |
| KR | 10-2013-0004408 A | 1/2013 |
| KR | 10-2013-0031456 A | 3/2013 |
| KR | 2013-0031455 A | 3/2013 |
| KR | 2013-0077146 A | 7/2013 |
| KR | 10-1317142 B1 | 10/2013 |
| WO | WO 2012084375 A1 | 6/2012 |

* cited by examiner

*FIG. 2*

| SHIFT STAGE | CL1 | CL2 | CL3 | CL4 | CL5 | CL6 | GEAR RATIO |
|---|---|---|---|---|---|---|---|
| 1ST | O | O |  |  |  | O | 5.318 |
| 2ND |  | O |  | O |  | O | 3.420 |
| 3RD | O | O |  | O |  |  | 2.550 |
| 4TH |  | O |  | O | O |  | 1.748 |
| 5TH | O | O |  |  | O |  | 1.601 |
| 6TH |  | O |  |  | O | O | 1.259 |
| 7TH |  |  |  | O | O | O | 1.000 |
| 8TH |  |  | O |  | O | O | 0.833 |
| 9TH | O |  | O |  | O |  | 0.612 |
| 10TH |  |  | O | O | O |  | 0.517 |
| REV | O |  | O |  |  | O | 1.786 |

MULTI STAGE TRANSMISSION FOR VEHICLE

CROSS REFERENCE TO RELATED APPLICATION

The present application claims priority to Korean Patent Application Number 10-2014-0166833 filed Nov. 26, 2014, the entire contents of which is incorporated herein for all purposes by this reference.

BACKGROUND OF THE INVENTION

1. Field of the Invention

The present invention relates to a multi stage transmission for a vehicle, and more particularly, to a technology of improving fuel efficiency of a vehicle by implementing shift stages as many as possible with the number of parts as few as possible and a simple configuration.

2. Description of Related Art

A recent rise in oil prices lets global car makers be rushed into limitless competition for improvement in fuel efficiency. In the case of an engine, efforts to reduce a weight of the engine and improve fuel efficiency using technologies such as downsizing have been actively conducted.

Meanwhile, among methods for improving fuel efficiency which may be applied to a transmission equipped in a vehicle, there is a method for ultimately improving fuel efficiency by implementing a multi stage transmission to enable an engine to be operated at a more efficient operating point.

Further, the multi stage transmission enables an engine to be operated in a relatively low RPM band, and as a result, silence of a vehicle may be more improved.

However, as the number of shift stages of the transmission is increased, the number of parts forming the transmission is increased. As a result, mounting performance and transfer efficiency may be decreased and weight and cost of manufacturing the vehicle may be increased. Therefore, to maximize an effect of improvement in fuel efficiency by the multi stage transmission, it is important to devise a structure of the transmission which may lead to maximum efficiency with a smaller number of parts and a relatively simpler configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi stage transmission for a vehicle capable of maximizing fuel efficiency of a vehicle by enabling an engine to be operated at an optimum operating point and improving silence of the vehicle by enabling the engine to be operated more silently, by implementing at least 10 forward stages and 1 reverse stage with a relatively smaller number of parts and a simple configuration.

According to various aspects of the present invention, a multi stage transmission for a vehicle may include an input shaft and an output shaft, a first planetary gear device, a second planetary gear device, a third planetary gear device, and a fourth planetary gear device configured to transfer a rotating force between the input shaft and the output shaft and each including three rotating elements, and at least six shift elements connected to the rotating elements of the planetary gear devices, in which a first rotating element of the first planetary gear device may be selectively connected to a first rotating element and a second rotating element of the second planetary gear device, respectively, a second rotating element of the first planetary gear device may be continuously connected to a second rotating element of the third planetary gear device, and a third rotating element of the first planetary gear device may be selectively connected to the first rotating element of the second planetary gear device and a third rotating element of the third planetary gear device, respectively, the second rotating element of the second planetary gear device may be continuously connected to the input shaft and a third rotating element of the second planetary gear device may be continuously connected to a first rotating element of the third planetary gear device, the first rotating element of the third planetary gear device may be continuously connected to a first rotating element of the fourth planetary gear device and the second rotating element of the third planetary gear device may be continuously connected to a third rotating element of the fourth planetary gear device, and the first rotating element of the fourth planetary gear device may be fixedly installed by any one of the shift elements, the second rotating element of the fourth planetary gear device may be continuously connected to the output shaft, and the third rotating element of the fourth planetary gear device may be fixedly installed by any other one of the shift elements.

The first planetary gear device, the second planetary gear device, the third planetary gear device, and the fourth planetary gear device may be sequentially disposed along a shaft direction of the input shaft and the output shaft.

The first rotating element of the fourth planetary gear device may be fixedly installed to a transmission case by a third clutch among the shift elements, the third rotating element of the fourth planetary gear device may be fixedly installed to the transmission case by a second clutch among the shift elements, and the remaining elements among the shift elements may be configured to form a selective connection structure among the rotating elements of the planetary gear devices.

A first clutch among the shift elements forms a selective connection structure between the first rotating element of the first planetary gear device and the second rotating element of the second planetary gear device, a fourth clutch among the shift elements forms a selective connection structure between the first rotating element of the first planetary gear device and the first rotating element of the second planetary gear device, a fifth clutch among the shift elements forms a selective connection structure between the third rotating element of the first planetary gear device and the first rotating element of the second planetary gear device, and a sixth clutch among the shift elements forms a selective connection structure between the third rotating element of the first planetary gear device and the third rotating element of the third planetary gear device.

According to various aspects of the present invention, a multi stage transmission for a vehicle may include a first planetary gear device, a second planetary gear device, a third planetary gear device, and a fourth planetary gear device configured to each have three rotating elements, six shift elements configured to selectively provide a friction force, and eight rotating shafts configured to be connected to the rotating elements of the planetary gear devices, in which a first rotating shaft may be an input shaft which may be directly connected to a second rotating element of the second planetary gear device, a second rotating shaft may be directly connected to a first rotating element of the second planetary gear device, a third rotating shaft may be directly connected to a first rotating element of the first planetary gear device, a fourth rotating shaft may be directly connected to a second rotating element of the first planetary gear device, a second rotating element of the third planetary gear device, and a third rotating element of the fourth planetary gear device, a fifth rotating shaft may be directly connected to a third rotating element of the first planetary gear device, a sixth rotating shaft may be directly connected to a third rotating element of the second planetary gear device, a first rotating element of the third planetary gear device, and a first rotating element of the fourth planetary gear device, a seventh rotating shaft may be directly connected to a third rotating element of the third planetary gear device, an eighth rotating shaft may be an output shaft which may be directly connected to a second rotating element of the fourth planetary gear device, and a first clutch among the six shift elements may be installed between the first rotating shaft and the third rotating shaft, a second clutch may be installed between the fourth rotating shaft and a transmission case, a third clutch may be installed between the sixth rotating shaft and the transmission case, a fourth clutch may be installed between the second rotating shaft and the third rotating shaft, a fifth clutch may be installed between the second rotating shaft and the fifth rotating shaft, and a sixth clutch may be installed between the fifth rotating shaft and the seventh rotating shaft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operating mode table of the transmission of FIG. 1.

Figure 1:
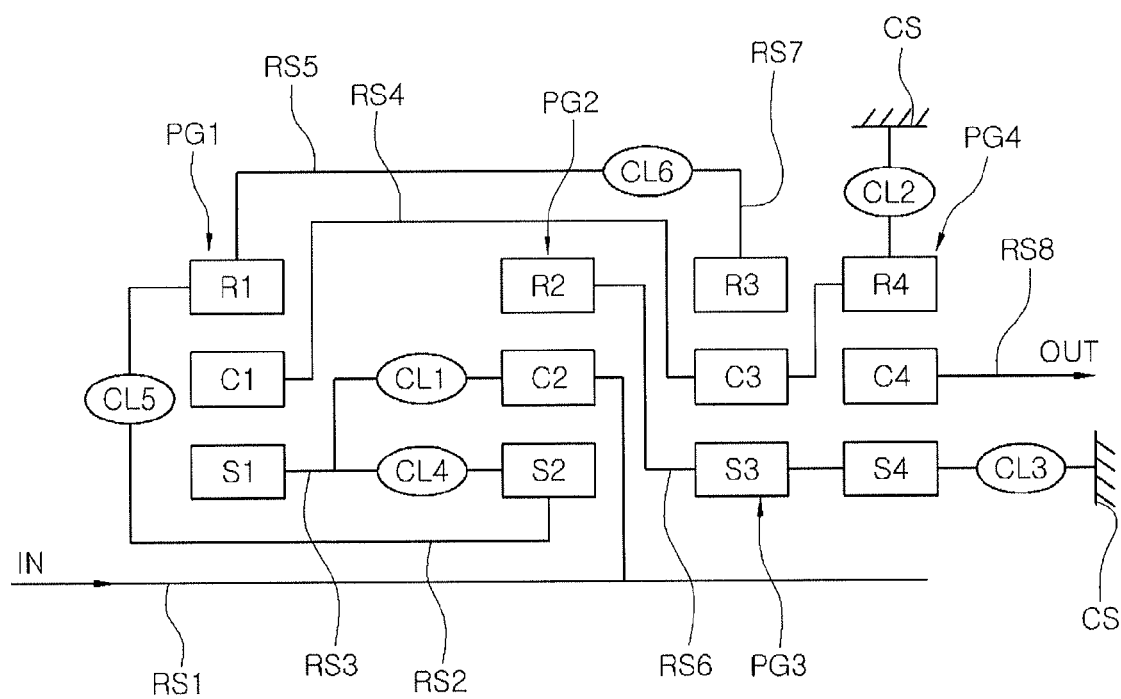
FIG. 1 is a configuration diagram illustrating an exemplary multi stage transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 and FIG. 2, a multi stage transmission for a vehicle according to various embodiments of the present invention includes an input shaft IN and an output shaft OUT, a first planetary gear device PG1, a second planetary gear device PG2, a third planetary gear device PG3, and a fourth planetary gear device PG4 provided to transfer a torque between the input shaft IN and the output shaft OUT and each include three rotating elements, and at least six shift elements configured to be connected the rotating elements of the planetary gear devices.

A first rotating element S1 of the first planetary gear device PG1 is selectively connected to a first rotating element S2 and a second rotating element C2 of the second planetary gear device PG2, respectively, a second rotating element C1 is continuously connected to a second rotating element C3 of the third planetary gear device PG3, and a third rotating element R1 is selectively connected to the first rotating element S2 of the second planetary gear device PG2 and a third rotating element R3 of the third planetary gear device PG3, respectively.

The second rotating element S2 of the second planetary gear device PG2 is continuously connected to an input shaft IN, the third rotating element R2 is continuously connected to the first rotating element S3 of the third planetary gear device PG3, the first rotating element S3 of the third planetary gear device PG3 is continuously connected to a first rotating element S4 of the fourth planetary gear device PG4, and the second rotating element C3 is continuously connected to a third rotating element R4 of the fourth planetary gear device PG4.

The first rotating element S4 of the fourth planetary gear device PG4 is fixedly installed by any one of the shift elements, the second rotating element C4 is continuously connected to an output shaft OUT, and the third rotating element R4 is fixedly installed by any other one of the shift elements.

The first planetary gear device PG1, the second planetary gear device PG2, the third planetary gear device PG3, and the fourth planetary gear device PG4 are sequentially disposed along a shaft direction of the input shaft IN and the output shaft OUT.

The first rotating element S4 of the fourth planetary gear device PG4 is fixedly installed to a transmission case CS by a third clutch CL3 among the shift elements and the third rotating element R4 of the fourth planetary gear device PG4 is fixedly installed to the transmission case CS by a second clutch CL2 among the shift elements.

Therefore, the third clutch CL3 and the second clutch CL2 each serve as a brake to convert the first rotating element S4 and the third rotating element R4 of the fourth planetary gear device PG4, respectively, into a rotatable state and a restricting state to make the rotation impossible.

The remaining elements among the shift elements are configured to form a selective connection structure among the rotating elements of the planetary gear devices.

That is, the first clutch CL1 among the shift elements forms a selective connection structure between the first rotating element S1 of the first planetary gear device PG1 and the second rotating element C2 of the second planetary gear device PG2, the fourth clutch CL4 among the shift elements forms a selective connection structure between the first rotating element S1 of the first planetary gear device PG1 and the first rotating element S2 of the second planetary gear device PG2, a fifth clutch CL5 among the shift elements forms a selective connection structure between the third rotating element R1 of the first planetary gear device PG1 and the first rotating element S2 of the second planetary gear device PG2, and a sixth clutch CL6 among the shift elements forms a selective connection structure between the third rotating element R1 of the first planetary gear device PG1 and the third rotating element R3 of the third planetary gear device PG3.

According to the various embodiments, the first rotating element S1, the second rotating element C1, and the third rotating element R1 of the first planetary gear device PG1 each are a first sun gear, a first carrier, and a first ring gear, the first rotating element S2, the second rotating element C2, and the third rotating element R2 of the second planetary gear device PG2 each are a second sun gear, a second carrier, and a second ring gear, the first rotating element S3, the second rotating element C3, and the third rotating element R3 of the third planetary gear device PG3 each are a third sun gear, a third carrier, and a third ring gear, and the first rotating element S4, the second rotating element C4, and the third rotating element R4 of the fourth planetary gear device PG4 each are a fourth sun gear, a fourth carrier, and a fourth ring gear.

The multi stage transmission for a vehicle configured as described above may be represented as follows.

That is, the multi stage transmission for a vehicle according to the various embodiments of the present invention includes the first planetary gear device PG1, the second planetary gear device PG2, the third planetary gear device PG3, and the fourth planetary gear device PG4 configured to each have three rotating elements, six shift elements configured to selectively provide a friction force, and eight rotating shafts configured to be connected to the rotating elements of the planetary gear devices.

In this configuration, a first rotating shaft RS1 is the input shaft IN which is directly connected to the second rotating element of the second planetary gear device PG2, a second rotating shaft RS2 is directly connected to the first rotating element of the second planetary gear device PG2, a third rotating shaft RS3 is directly connected to the first rotating element of the first planetary gear device PG1, a fourth rotating shaft RS4 is directly connected to the second rotating element of the first planetary gear device PG1, the second rotating element of the third planetary gear device PG3, and the third rotating element of the fourth planetary gear device PG4, a fifth rotating shaft RS5 is directly connected to the third rotating element of the first planetary gear device PG1, a sixth rotating shaft RS6 is directly connected to the third rotating element of the second planetary gear device PG2, the first rotating element of the third planetary gear device PG3, and the first rotating element of the fourth planetary gear device PG4, a seventh rotating shaft RS7 is directly connected to the third rotating element of the third planetary gear device PG3, and an eighth rotating shaft RS8 is an output shaft OUT which is directly connected to the second rotating element of the fourth planetary gear device PG4.

Further, the first clutch CL1 among the six shift elements is installed between the first rotating shaft RS1 and the third rotating shaft RS3, the second clutch CL2 is installed between the fourth rotating shaft RS4 and the transmission case CS, the third clutch CL3 is installed between the sixth rotating shaft RS6 and the transmission case CS, the fourth clutch CL4 is installed between the second rotating shaft RS2 and the third rotating shaft RS3, the fifth clutch CL5 is installed between the second rotating shaft RS2 and the fifth rotating shaft RS5, and the sixth clutch CL6 is installed between the fifth rotating shaft RS5 and the seventh rotating shaft RS7.

As described above, the multi stage transmission for a vehicle configured to include four simple planetary gear devices and six shift elements implements 10 forward stages and 1 reverse stage depending on an operating mode table as illustrated in FIG. 2, and therefore multi shift stage of 10 stages may be implemented with a relatively smaller number of parts and the simple configuration to improve the fuel efficiency of the vehicle and the silence of the vehicle, thereby improving marketability of the vehicle.

According to the various embodiments of the present invention, it is possible to maximize the fuel efficiency of the vehicle by enabling the engine to be operated at the optimum operating point and improve the silence of the vehicle by enabling the engine to be operated more silently, by implementing at least 10 forward stages and 1 reverse stage or more with a relatively smaller number of parts and the simple configuration.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi stage transmission for a vehicle, comprising:
an input shaft and an output shaft;
a first planetary gear device, a second planetary gear device, a third planetary gear device, and a fourth planetary gear device configured to transfer a rotating force between the input shaft and the output shaft and each including three rotating elements; and
at least six shift elements connected to at least one of the three rotating elements of the first, second, third, and fourth planetary gear devices,
wherein a first rotating element of the first planetary gear device is selectively connected to a first rotating element and a second rotating element of the second planetary gear device, respectively, a second rotating element of the first planetary gear device is continuously connected to a second rotating element of the third planetary gear device, and a third rotating element of the first planetary gear device is selectively connected to the first rotating element of the second planetary gear device and a third rotating element of the third planetary gear device, respectively,
the second rotating element of the second planetary gear device is continuously connected to the input shaft and a third rotating element of the second planetary gear device is continuously connected to a first rotating element of the third planetary gear device, the first rotating element of the third planetary gear device is continuously connected to a first rotating element of the fourth planetary gear device and the second rotating element of the third planetary gear device is continuously connected to a third rotating element of the fourth planetary gear device, and the first rotating element of the fourth planetary gear device is fixedly installed by one of the shift elements, the second rotating element of the fourth planetary gear device is continuously connected to the output shaft, and the third rotating element of the fourth planetary gear device is fixedly installed by any other one of the shift elements.

2. The multi stage transmission for the vehicle of claim 1, wherein the first planetary gear device, the second planetary gear device, the third planetary gear device, and the fourth planetary gear device are sequentially disposed along a shaft direction of the input shaft and the output shaft.

3. The multi stage transmission for the vehicle of claim 2, wherein the first rotating element of the fourth planetary gear device is fixedly installed to a transmission case by a third clutch among the shift elements, the third rotating element of the fourth planetary gear device is fixedly installed to the transmission case by a second clutch among the shift elements, and remaining elements among the shift elements are configured to form a selective connection structure among the rotating elements of the first, second, thrid and fourth planetary gear devices.

4. The multi stage transmission for the vehicle of claim 3, wherein a first clutch among the shift elements forms a selective connection structure between the first rotating element of the first planetary gear device and the second rotating element of the second planetary gear device, a fourth clutch among the shift elements forms a selective connection structure between the first rotating element of the first planetary gear device and the first rotating element of the second planetary gear device, a fifth clutch among the shift elements forms a selective connection structure between the third rotating element of the first planetary gear device and the first rotating element of the second planetary gear device, and a sixth clutch among the shift elements forms a selective connection structure between the third rotating element of the first planetary gear device and the third rotating element of the third planetary gear device.

5. A multi stage transmission for a vehicle, comprising:
a first planetary gear device, a second planetary gear device, a third planetary gear device, and a fourth planetary gear device configured to each have three rotating elements respectively;
six shift elements configured to selectively provide a friction force; and
eight rotating shafts configured to be connected to the rotating elements of the first, second, third and fourth planetary gear devices, wherein a first rotating shaft is an input shaft which is directly connected to a second rotating element of the second planetary gear device,
a second rotating shaft is directly connected to a first rotating element of the second planetary gear device,
a third rotating shaft is directly connected to a first rotating element of the first planetary gear device,
a fourth rotating shaft is directly connected to a second rotating element of the first planetary gear device, a second rotating element of the third planetary gear device, and a third rotating element of the fourth planetary gear device,
a fifth rotating shaft is directly connected to a third rotating element of the first planetary gear device,
a sixth rotating shaft is directly connected to a third rotating element of the second planetary gear device, a first rotating element of the third planetary gear device, and a first rotating element of the fourth planetary gear device,
a seventh rotating shaft is directly connected to a third rotating element of the third planetary gear device,
an eighth rotating shaft is an output shaft which is directly connected to a second rotating element of the fourth planetary gear device, and
a first clutch among the six shift elements is installed between the first rotating shaft and the third rotating shaft, a second clutch is installed between the fourth rotating shaft and a transmission case, a third clutch is installed between the sixth rotating shaft and the transmission case, a fourth clutch is installed between the second rotating shaft and the third rotating shaft, a fifth clutch is installed between the second rotating shaft and the fifth rotating shaft, and a sixth clutch is installed between the fifth rotating shaft and the seventh rotating shaft.

6. The multi stage transmission for the vehicle of claim 5, wherein the first planetary gear device, the second planetary gear device, the third planetary gear device, and the fourth planetary gear device are sequentially disposed along a shaft direction of the input shaft and the output shaft.

7. The multi stage transmission for the vehicle of claim 5, wherein the first clutch is installed to selectively connect between the first rotating element of the first planetary gear device and the second rotating element of the second planetary gear device,
the fourth clutch is installed to selectively connect between the first rotating element of the first planetary gear device and the first rotating element of the second planetary gear device,
the fifth clutch is installed to selectively connect between the third rotating element of the first planetary gear device and the first rotating element of the second planetary gear device, and
the sixth clutch is installed to selectively connect between the third rotating element of the first planetary gear device and the third rotating element of the third planetary gear device.

* * * * *